US012266897B2

(12) United States Patent
Takeuchi et al.

(10) Patent No.: US 12,266,897 B2
(45) Date of Patent: Apr. 1, 2025

(54) TERMINAL AND WIRE WITH TERMINAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shunya Takeuchi, Mie (JP); Hajime Kawase, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 335 days.

(21) Appl. No.: 17/924,900

(22) PCT Filed: May 17, 2021

(86) PCT No.: PCT/JP2021/018525
§ 371 (c)(1),
(2) Date: Nov. 11, 2022

(87) PCT Pub. No.: WO2021/241294
PCT Pub. Date: Dec. 2, 2021

(65) Prior Publication Data

US 2023/0198172 A1 Jun. 22, 2023

(30) Foreign Application Priority Data

May 29, 2020 (JP) ................................ 2020-094008

(51) Int. Cl.
*H01R 4/50* (2006.01)
*H01R 4/18* (2006.01)
(Continued)

(52) U.S. Cl.
CPC ............... *H01R 4/183* (2013.01); *H01R 4/28* (2013.01); *H01R 4/5041* (2013.01); *H01R 11/12* (2013.01); *H01R 13/11* (2013.01); *H01R 43/16* (2013.01)

(58) Field of Classification Search
None
See application file for complete search history.

(56) References Cited

U.S. PATENT DOCUMENTS 7,306,495 B2 12/2007 Hashimoto et al.
10,944,187 B2 * 3/2021 Takeuchi ............... H01R 4/188
(Continued)

FOREIGN PATENT DOCUMENTS

JP H10-199590 A 7/1998
JP 2018-081818 A 5/2018

OTHER PUBLICATIONS

International Search Report issued on Jul. 27, 2021 for WO 2021/241294 A1 (4 pages).

*Primary Examiner* — Ross N Gushi
(74) *Attorney, Agent, or Firm* — Venjuris, P.C.

(57) ABSTRACT

A terminal to be connected to a front end part of a wire in an extending direction is provided with a terminal body for sandwiching the wire, and a slide member slidable with respect to the terminal body along the extending direction of the wire. The terminal body is formed by a worked metal plate material and includes a sandwiching portion for sandwiching the wire. The sandwiching portion includes a first holding protrusion formed by folding the metal plate material on a side edge intersecting the extending direction of the wire, projecting toward the wire and configured to contact the wire and a second holding protrusion formed to be located forward of the first holding protrusion in the extending direction of the wire by folding the metal plate material
(Continued)

on a side edge along the extending direction of the wire, projecting toward the wire and configured to contact the wire.

5 Claims, 10 Drawing Sheets

(51) Int. Cl.

| | |
|---|---|
| ***H01R 4/28*** | (2006.01) |
| ***H01R 11/12*** | (2006.01) |
| *H01R 13/11* | (2006.01) |
| *H01R 43/16* | (2006.01) |

(56) References Cited

U.S. PATENT DOCUMENTS

| | | | | |
|---|---|---|---|---|
| 11,152,718 | B2 * | 10/2021 | Miyamura | H01R 4/5083 |
| 11,165,172 | B2 * | 11/2021 | Miyamura | H01B 7/00 |
| 11,228,152 | B2 * | 1/2022 | Miyamura | H01R 31/06 |
| 11,394,136 | B2 * | 7/2022 | Takeuchi | H01R 4/50 |
| 11,637,386 | B2 * | 4/2023 | Hara | H01R 4/26<br>439/775 |
| 11,710,911 | B2 * | 7/2023 | Takeuchi | H01R 4/206<br>439/775 |
| 11,710,912 | B2 * | 7/2023 | Takeuchi | H01R 4/183<br>439/879 |
| 11,757,227 | B2 * | 9/2023 | Ikeda | H01R 13/4368<br>439/383 |
| 11,764,493 | B2 * | 9/2023 | Takeuchi | H01R 4/28<br>439/775 |
| 11,769,959 | B2 * | 9/2023 | Wi | H01R 13/113<br>439/586 |
| 11,799,216 | B2 * | 10/2023 | Takeuchi | H01R 4/5083 |
| 11,843,194 | B2 * | 12/2023 | Jo | H01R 4/5075 |
| 11,843,214 | B2 * | 12/2023 | Jo | H01R 4/646 |
| 11,848,527 | B2 * | 12/2023 | Takeuchi | H01R 4/50 |
| 11,888,250 | B2 * | 1/2024 | Jo | H01R 4/28 |
| 11,888,277 | B2 * | 1/2024 | Wi | H01R 4/5075 |
| 11,942,737 | B2 * | 3/2024 | Kobayashi | H01R 13/502 |
| 11,955,750 | B2 * | 4/2024 | Kobayashi | H01R 13/639 |
| 11,996,644 | B2 * | 5/2024 | Hara | H01R 13/26 |
| 12,062,874 | B2 * | 8/2024 | Kobayashi | H01R 13/42 |
| 12,074,401 | B2 * | 8/2024 | Takeuchi | H01R 4/489 |
| 2019/0252803 | A1 | 8/2019 | Takeuchi et al. | |
| 2021/0234286 | A1 | 7/2021 | Miyamura et al. | |

* cited by examiner

TERMINAL AND WIRE WITH TERMINAL

CROSS REFERENCE TO RELATED APPLICATIONS

This application is a national phase of PCT application No. PCT/JP2021/018525, filed on 17, May 2021, which claims priority from Japanese patent application No. 2020-094008, filed on 29, May 2020, all of which are incorporated herein by reference.

TECHNICAL FIELD

The present disclosure relates to a terminal and a wire with terminal.

BACKGROUND

Conventionally, a wire with terminal is known in which a terminal is connected to a core wire exposed from an end of a wire. A terminal provided with a crimping portion to be crimped to the core wire exposed from the end wire from outside is, for example, known as such a terminal.

The above terminal is crimped to the wire, for example, as follows. First, the terminal of a predetermined shape is formed by press-working a metal plate material. Subsequently, the terminal is placed on a placing section of a lower mold located on a lower side, out of a pair of molds relatively movable in a vertical direction. Subsequently, the core wire exposed from the end of the wire is overlapped and placed on the crimping portion of the terminal. Thereafter, one or both of the pair of molds are moved in directions toward each other and the crimping portion is sandwiched between a crimping section of the upper mold and the placing section of the lower mold, whereby the crimping portion is crimped to the core wire of the wire. In the above way, the terminal is connected to the end of the wire (Patent Document 1).

PRIOR ART DOCUMENT

Patent Document

Patent Document 1: JP 2005-050736 A

SUMMARY OF THE INVENTION

Problems to be Solved

However, since a relatively large-scale facility such as the molds or a jig for crimping the crimping portion of the terminal to the core wire of the wire is necessary according to the above technique, facility investment is necessary, which leads to a problem of increasing manufacturing cost.

To solve the above problem, the following terminal is considered. The terminal is provided with a terminal body including a sandwiching portion deformable along an extending direction of a wire and a slide member movable with respect to the terminal body along the extending direction of the wire. The slide member includes a pressurizing portion for pressing the sandwiching portion to the wire with the wire disposed in the sandwiching portion.

In the above terminal, to further reduce manufacturing cost, it is considered to form the terminal body of a metal plate material and provide the sandwiching portion with a holding protrusion configured to project toward and contact the wire by folding the metal plate material. However, depending on the form of the holding protrusion, it becomes difficult to insert the wire into the terminal body and there is a possibility that the wire is caught by an end edge of the holding protrusion to turn up the folded part if the wire is buckled or a force is applied to the wire in a direction to pull out the wire from the terminal body when the wire is mounted.

A technique disclosed in this specification was completed on the basis of the above situation and aims to provide a terminal with an improved wire holding force and improved work efficiency in inserting a wire into the terminal.

Means to Solve the Problem

A terminal according to the present disclosure is a terminal to be connected to a front end part of a wire in an extending direction and is provided with a terminal body for sandwiching the wire and a slide member slidable with respect to the terminal body along the extending direction of the wire, the terminal body being formed by a worked metal plate material, the terminal body including a sandwiching portion for sandwiching the wire, the sandwiching portion including a first holding protrusion formed by folding the metal plate material on a side edge intersecting the extending direction of the wire, projecting toward the wire and configured to contact the wire and a second holding protrusion formed to be located forward of the first holding protrusion in the extending direction of the wire by folding the metal plate material on a side edge along the extending direction of the wire, projecting toward the wire and configured to contact the wire, and the slide member including a pressurizing portion for pressing the sandwiching portion toward the wire.

Effect of the Invention

According to the present disclosure, it is possible to provide a terminal with an improved wire holding force and improved work efficiency in inserting a wire into the terminal.

DETAILED DESCRIPTION TO EXECUTE THE INVENTION

Description of Embodiments of Present Disclosure

Figure 1:
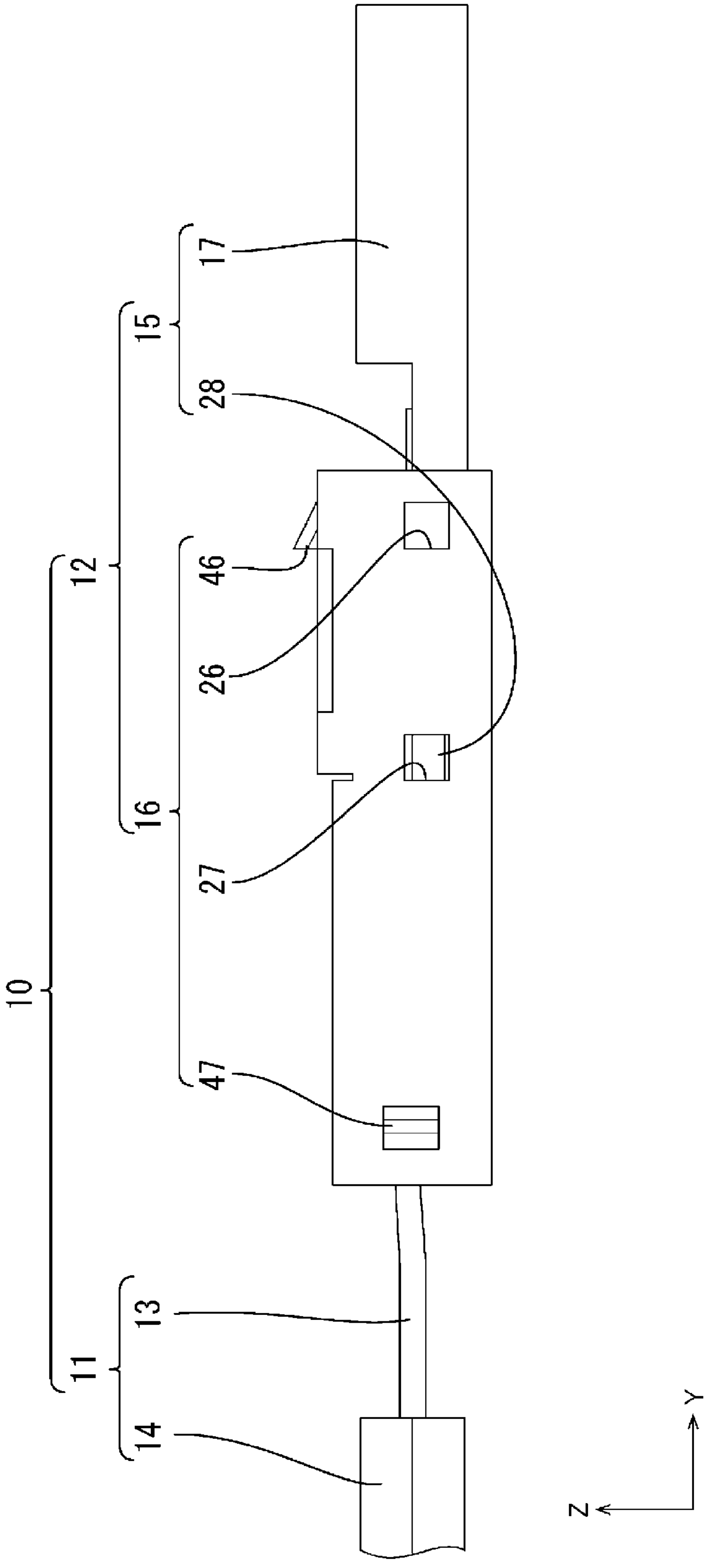
FIG. 1 is a side view showing a wire with terminal according to an embodiment.

First, embodiments of the present disclosure are listed and described.

(1) The terminal of the present disclosure is a terminal to be connected to a front end part of a wire in an extending direction and is provided with a terminal body for sandwiching the wire and a slide member slidable with respect to the terminal body along the extending direction of the wire, the terminal body being formed by a worked metal plate material, the terminal body including a sandwiching portion for sandwiching the wire, the sandwiching portion including a first holding protrusion formed by folding the metal plate material on a side edge intersecting the extending direction of the wire, projecting toward the wire and configured to contact the wire and a second holding protrusion formed to be located forward of the first holding protrusion in the extending direction of the wire by folding the metal plate material on a side edge along the extending direction of the wire, projecting toward the wire and configured to contact the wire, and the slide member including a pressurizing portion for pressing the sandwiching portion toward the wire.

According to the configuration of (1), out of the first and second holding protrusions, the first holding protrusion disposed on a rear side in the extending direction of the wire, i.e. on a wire insertion side, is formed by folding the metal plate material on the side edge (e.g. rear side edge) intersecting the extending direction of the wire. Thus, in the terminal according to the present disclosure, an end surface (rear end surface) of the sandwiching portion located on the wire insertion side is a smoothly curved surface, and the wire can be smoothly inserted while buckling is suppressed. As a result, according to the terminal of the present disclosure, the efficiency of an inserting operation of the wire into the terminal can be improved. Further, the second holding protrusion disposed on a front side in the extending direction of the wire is formed by folding the metal plate material on the side edge along the extending direction of the wire. Thus, in the terminal according to the present disclosure, one end of the front end surface of the sandwiching portion is coupled and fixed to another part, and the folded part is hardly turned up even if the wire is pulled rearward. As a result, a holding force for holding the wire can be improved according to the terminal of the present disclosure.

(2) Preferably, the first and second holding protrusions are disposed at an interval in the extending direction of the wire.

According to the configuration of (2), if the sandwiching portion is pressed toward the wire by the pressurizing portion, the first and second holding protrusions are pressed against the wire and an edge formed on the rear end of the second holding protrusion and an edge formed on the front end of the first holding protrusion bite into the wire. As a result, the terminal according to the present disclosure is excellent in electrical connection reliability with the wire and wire holding force. Note that an interval between the first and second holding protrusions is preferably set smaller (e.g. 0.1-fold to 0.8-fold, more specifically 0.4-fold to 0.8-fold) than a diameter of the wire (core wire) to be sandwiched. Within such a range, the electrical connection reliability and the wire holding force can be improved while the efficiency of the wire inserting operation is satisfactorily maintained.

(3) Preferably, at least one of the first or second holding protrusions has burrs formed by working the metal plate material and is formed to contact the wire with the burrs projecting toward the wire.

According to the configuration of (3), if the sandwiching portion is pressed toward the wire by the pressurizing portion, at least parts of the burrs formed by working the metal plate material bite into the wire at the first or second holding protrusion. As a result, the terminal according to the present disclosure is excellent in electrical connection reliability with the wire and wire holding force.

(4) A wire with terminal according to the present disclosure is provided with the terminal of any one of (1) to (3) described above and a wire to be connected to the terminal.

Details of Embodiment of Present Disclosure

Hereinafter, an embodiment of the present disclosure is described. The present invention is not limited to these illustrations and is intended to be represented by claims and include all changes in the scope of claims and in the meaning and scope of equivalents.

Embodiment

The embodiment of the present disclosure is described with reference to FIGS. 1 to 10. A wire with terminal 10 according to this embodiment is provided with a wire 11 and a terminal 12 to be connected to the wire 11. In the following description, a direction indicated by an arrow Z is referred to as an upward direction, a direction indicated by an arrow Y is referred to as a forward direction and a direction indicated by an arrow X is referred to as a leftward direction. Note that, for a plurality of identical members, only some members may be denoted by a reference sign and the other members may not be denoted by the reference sign below.

Wire 11

As shown in FIG. 1, the wire 11 is disposed to extend in a front-rear direction (an example of an extending direction). The wire 11 is such that the outer periphery of a core wire 13 is surrounded with an insulation coating 14 made of insulating synthetic resin. The core wire 13 according to this embodiment is constituted by one metal wire. Note that the core wire 13 may be a stranded wire formed by stranding a plurality of metal thin wires. An arbitrary metal such as copper, copper alloy, aluminum or aluminum alloy can be appropriately selected as a metal constituting the core wire 13 if necessary. The core wire 13 according to this embodiment is made of copper or copper alloy.

Terminal 12

As shown in FIG. 1, the terminal 12 includes a terminal body 15 made of metal and a slide member 16 relatively slidable with respect to the terminal body 15.

Terminal Body 15

The terminal body 15 is formed by applying shearing and bending to a metal plate material. An arbitrary metal such as copper, copper alloy, aluminum, aluminum alloy or stainless steel can be appropriately selected as a metal constituting the terminal body 15 if necessary. The terminal body 15 according to this embodiment is made of copper or copper alloy. A plating layer may be formed on the surface of the terminal body 15. An arbitrary metal such as tin, nickel or silver can be appropriately selected as a metal constituting the plating layer if necessary. Tin plating is applied to the terminal body 15 according to this embodiment.

Figure 2:
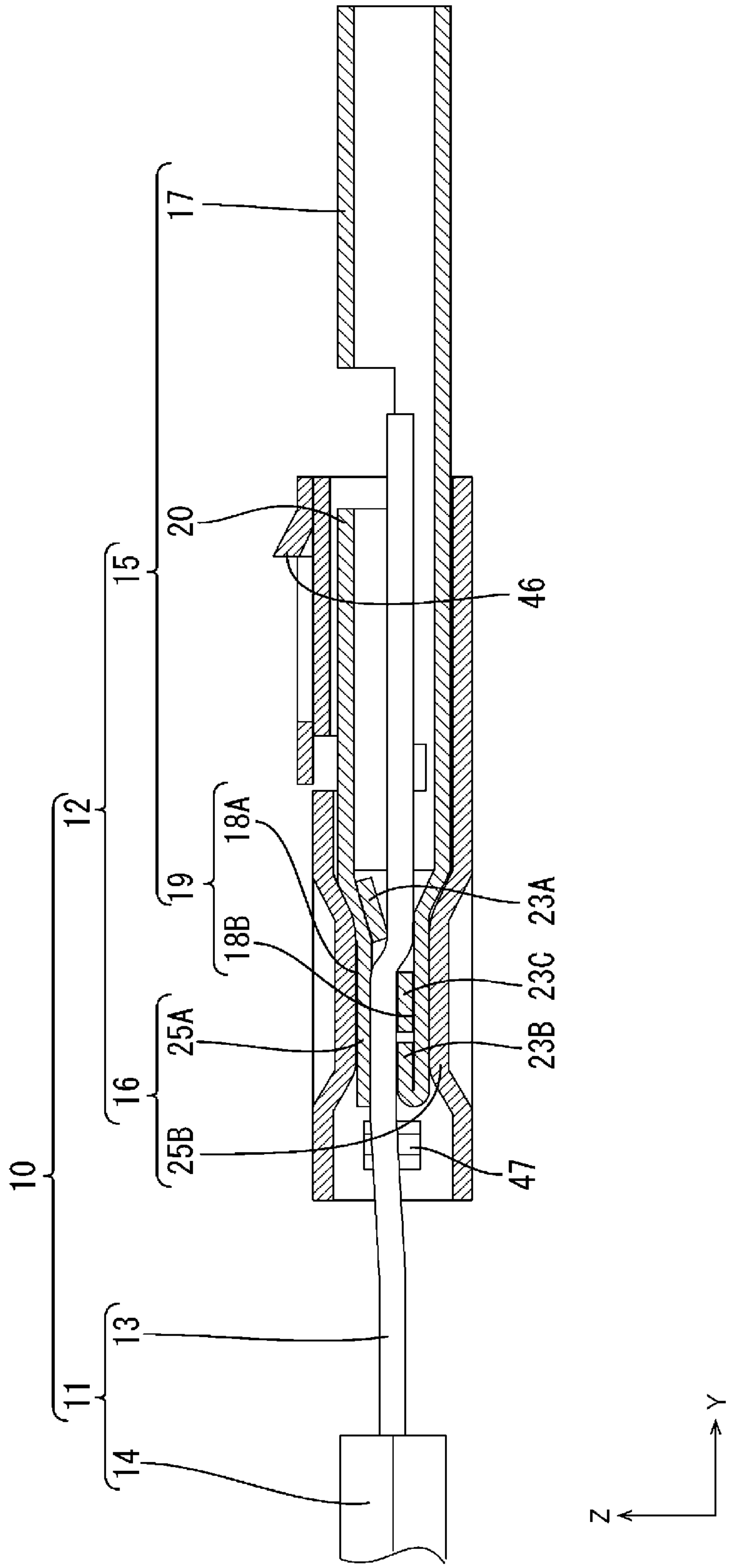
FIG. 2 is a side view in section showing the wire with terminal.

As shown in FIG. 2, the terminal body 15 includes a tube portion 17 into which an unillustrated mating terminal is insertable, a base portion 20 located behind the tube portion 17 and a sandwiching portion 19 located behind the base portion 20.

As shown in FIG. 2, the tube portion 17 is in the form of a rectangular tube extending in the front-rear direction. The front end of the tube portion 17 is open so that the mating terminal is insertable thereinto. An unillustrated resilient contact piece is disposed inside the tube portion 17. The resilient contact piece resiliently contacts the mating terminal inserted into the tube portion 17, whereby the tube portion 17 and the mating terminal are electrically connected.

Figure 3:
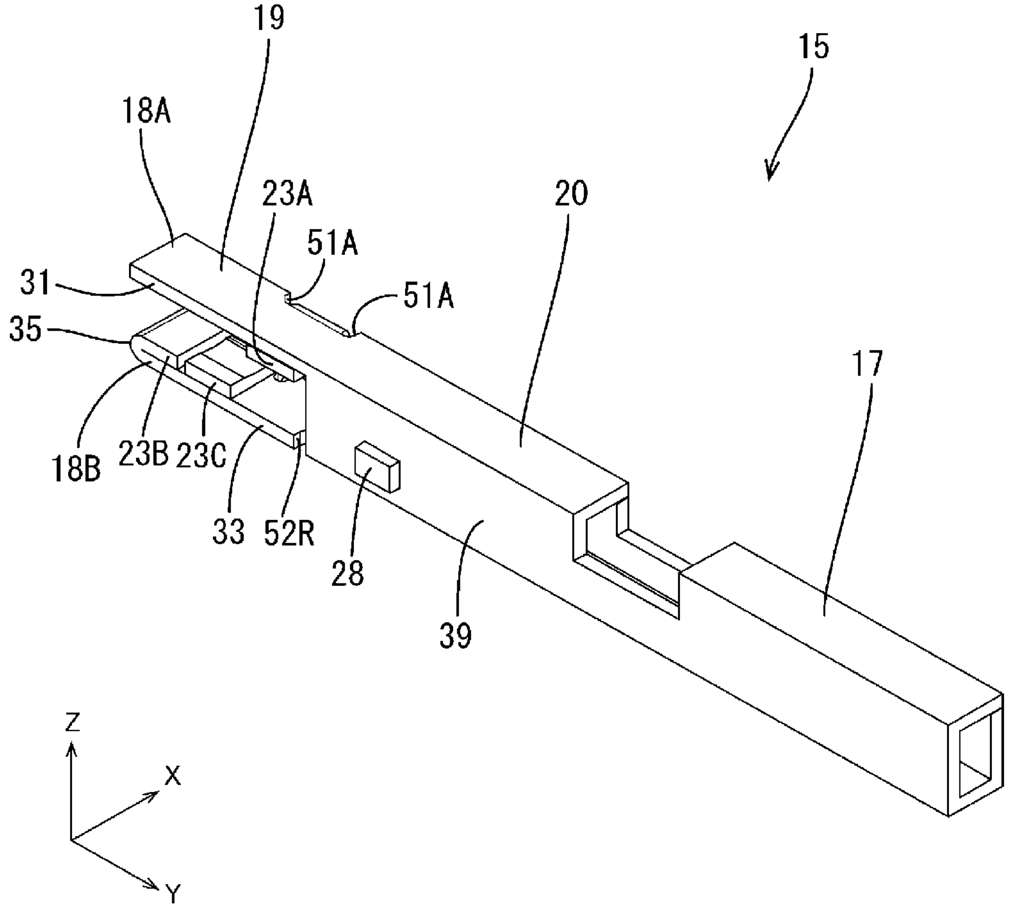
FIG. 3 is a perspective view showing a terminal body.
Figure 4:
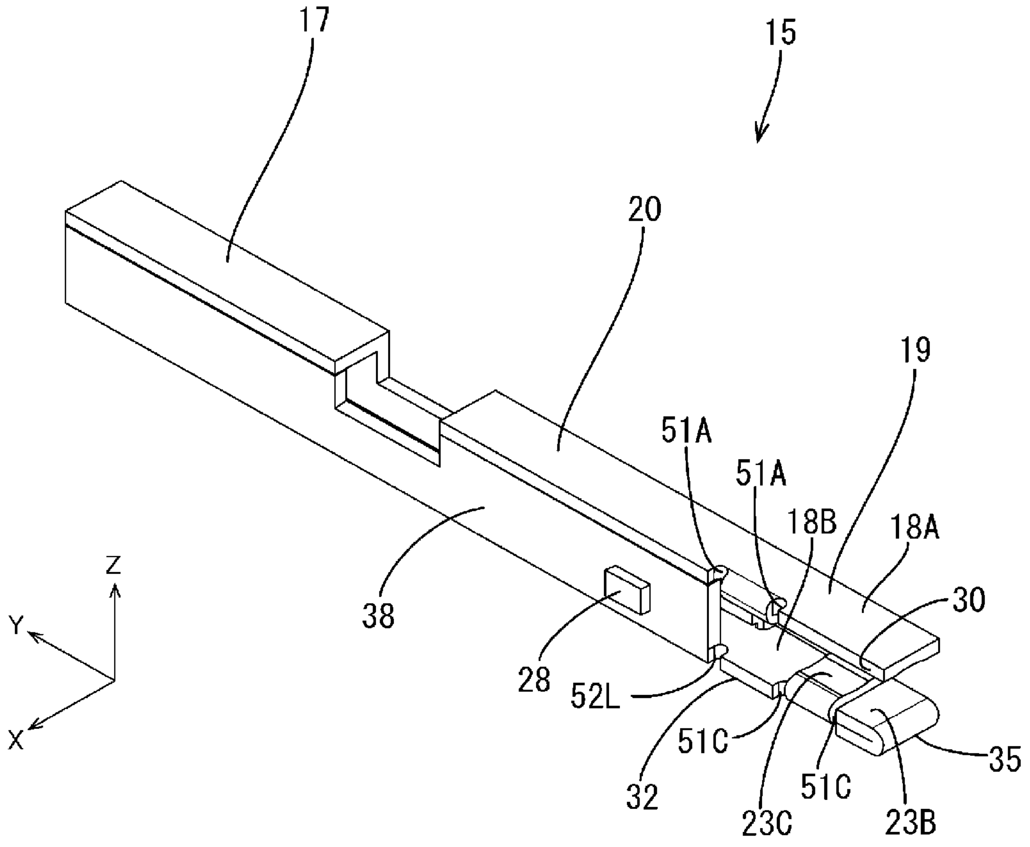
FIG. 4 is a perspective view showing the terminal body.

As shown in FIGS. 3, 4 and the like, the base portion 20 provided behind the tube portion 17 is in the form of a rectangular tube, an upper sandwiching piece 18A constituting the sandwiching portion 19 is provided to extend rearward from the rear end of the upper wall of the base portion 20 and a lower sandwiching piece 18B likewise constituting the sandwiching portion 19 is provided to extend rearward from the rear end of the lower wall of the base portion 20. The upper and lower sandwiching pieces 18A, 18B are both cantilevered such that tip sides are resiliently deformable in a vertical direction with a rear end part of the base portion 20 as a fulcrum. The upper and lower sandwiching pieces 18A, 18B have a shape elongated in the front-rear direction and are so formed that lengths in the front-rear direction and lateral direction thereof are substantially equal. The base portion 20 is formed with a right side wall 39 (see FIG. 3) rising from a position in front of a right side edge 31 of the upper sandwiching piece 18A and a right side edge 33 of the lower sandwiching piece 18B and coupling the upper and lower walls and a left side wall 38 (see FIG. 4) rising from a position in front of a left side edge 30 of the upper sandwiching piece 18A and a left side edge 32 of the lower sandwiching piece 18B and coupling the upper and lower walls.

As shown in FIGS. 3, 4 and the like, an upper holding protrusion 23A projecting downward is provided at a position near the base portion 20 on the lower surface of the upper sandwiching piece 18A. As shown in FIG. 4, the upper holding protrusion 23A is formed by folding a part projecting from the left side edge 30 of the upper sandwiching piece 18A into close contact with the lower surface of the upper sandwiching piece 18A. As shown in FIG. 3, the right end of the upper holding protrusion 23A is formed not to project rightward from the right side edge 31 of the upper sandwiching piece 18A. Further, cuts 51A are provided in front of and behind a base end part of the upper holding protrusion 23A in the upper sandwiching piece 18A, whereby the upper holding protrusion 23A is easily folded onto the lower surface of the upper sandwiching piece 18A and the left end of the upper holding protrusion 23A in the folded state does not project leftward from the left side edge 30 in other parts of the upper sandwiching piece 18A.

As shown in FIGS. 3, 4 and the like, a first holding protrusion 23B and a second holding protrusion 23C projecting upward are provided in a rear end part of the upper surface of the lower sandwiching piece 18B.

As shown in FIGS. 3 and 4, the first holding protrusion 23B is formed by folding a part extending rearward from a rear side edge 35 of the lower sandwiching piece 18B into close contact with the upper surface of the lower sandwiching piece 18B. In other words, the first holding protrusion 23B is formed by folding the metal plate material on the rear side edge 35 (side edge intersecting the extending direction of the wire 11) of the lower sandwiching piece 18B. In this way, the rear end surface of the lower sandwiching piece 18B is a curved surface smoothly coupling the lower surface of the lower sandwiching piece 18B and the upper surface of the first holding protrusion 23B.

As shown in FIG. 4 and the like, the second holding protrusion 23C is formed by folding a part projecting from the left side edge 32 of the lower sandwiching piece 18B at a position forward of the first holding protrusion 23B into close contact with the upper surface of the lower sandwiching piece 18B. In other words, the second holding protrusion 23C is formed by folding the metal plate material on the left side edge 32 (side edge along the extending direction of the wire 11) of the lower sandwiching piece 18B. In this way, a front end edge 50CF having a left side part coupled to the left side edge 30 is formed on the front end of the second holding protrusion 23C (see FIG. 5). Note that, as shown in FIG. 3, the right end of the second holding protrusion 23C is formed not to project rightward from the right side edge 33 of the lower sandwiching piece 18B. Further, as shown in FIG. 4, cuts 51C are provided in front of and behind a base end part of the second holding protrusion 23C on the lower sandwiching piece 18B, whereby the second holding protrusion 23C is easily folded onto the upper surface of the lower sandwiching piece 18B and the left end of the second holding protrusion 23C in the folded state does not project leftward from the left side edge 30 in other parts of the lower sandwiching piece 18B. A region of a rear end part of the lower sandwiching piece 18B where the first and second holding protrusions 23B, 23C are provided is hardly deflected by being reinforced by these.

A left easily bending portion 52L cut rightward from the left side edge 32 of the lower sandwiching piece 18B (see FIG. 4) and a right easily bending portion 52R cut leftward from the right side edge 33 of the lower sandwiching piece 18B (see FIG. 3) are provided in a front end part of the lower sandwiching piece 18B. The left and right easily bending portions 52L, 52R are provided at the same position in the front-rear direction. A part of the lower sandwiching piece 18B where the left and right easily bending portions 52L, 52R are provided is formed narrower in the lateral direction than other parts. In this way, the lower sandwiching piece 18B is bent with the left and right easily bending portions 52L, 52R as starting points.

Figure 5:
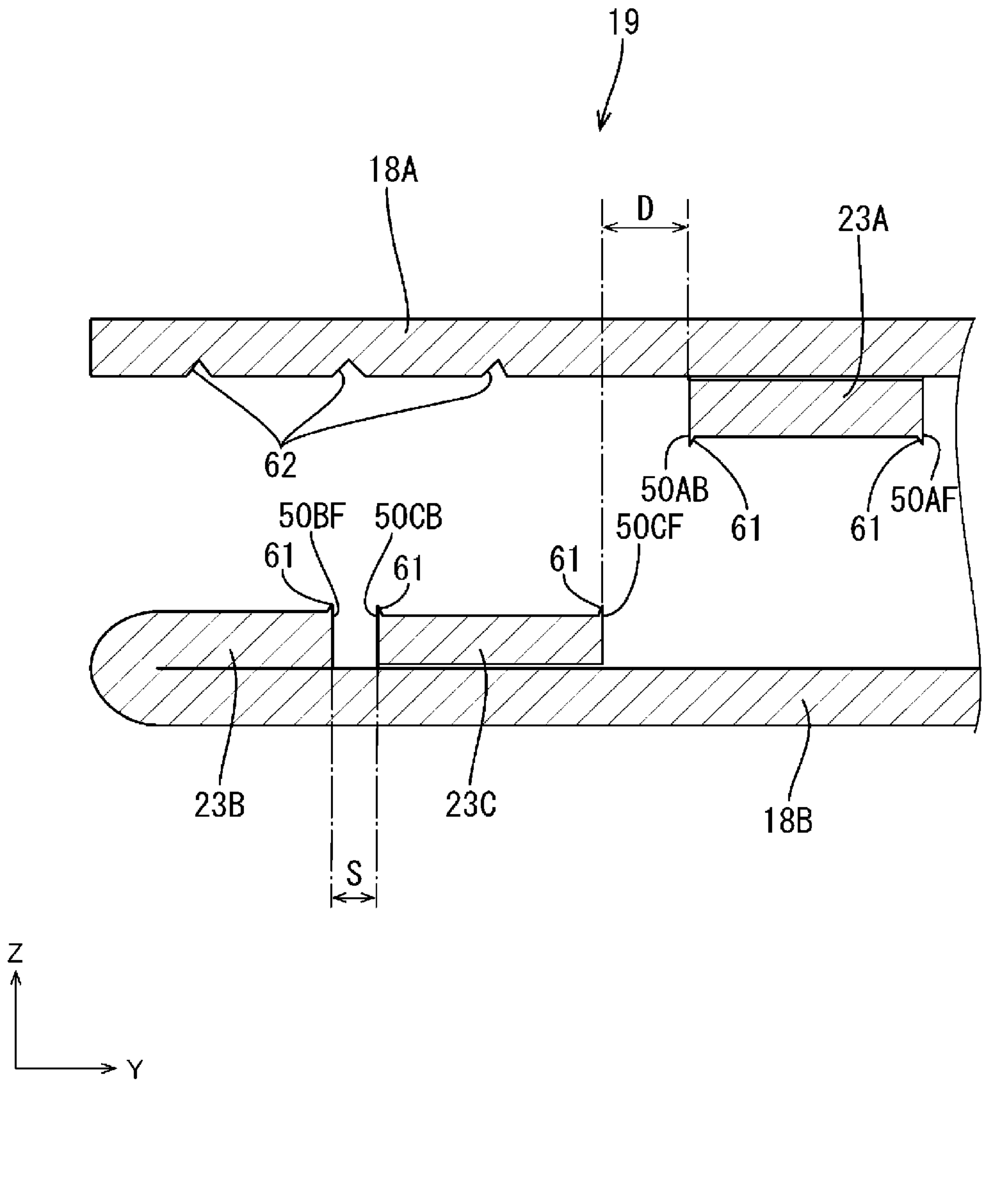
FIG. 5 is a side view in section enlargedly and schematically showing a main part of the terminal body.

As described above, since the terminal body 15 is manufactured by bending a metal plate material 60 cut out to have predetermined dimensions and shape by shearing, tiny projections, i.e. burrs, projecting forward in a shearing direction are formed on a sheared end edge of the metal plate material 60 and, conversely, a so-called droop in the form of a slightly curved surface is unavoidably formed on a rear side in the shearing direction. As schematically shown in FIG. 5, the burrs 61 are formed to have a sharply pointed tip. In this embodiment, the burrs 61 are set to project toward the core wire 13 from the lower surface of the upper holding protrusion 23A and the upper surfaces of the first and second holding protrusions 23B, 23C. As shown in FIG. 5, in the sandwiching portion 19 according to this embodiment, the burrs 61 are located on an front end edge 50AF and a rear end edge 50AB of the upper holding protrusion 23A, a front end edge 50BF of the first holding protrusion 23B and the front end edge 50CF and a rear end edge 50CB of the second holding protrusion 23C.

As shown in FIG. 5 and the like, in the sandwiching portion 19, the upper holding protrusion 23A, the first holding protrusion 23B and the second holding protrusion 23C are provided at positions shifted from each other in the front-rear direction, specifically provided such that the second holding protrusion 23C is located between the upper holding protrusion 23A and the first holding protrusion 23B.

As shown in FIG. 5, the front end edge of the second holding protrusion 23C formed on the lower sandwiching piece 18B is shifted rearward by a distance D in the front-rear direction (extending direction of the wire 11) from the rear end edge of the upper holding protrusion 23A formed on the upper sandwiching piece 18A. The distance D is set equal to or less than a diameter of the core wire 13 (e.g. specifically 0.4-fold to 1.0-fold of the diameter of the core wire 13).

By providing the distance D, the core wire 13 is sandwiched in a state bent in the vertical direction by the upper and lower sandwiching pieces 18A, 18B as shown in FIG. 2. If the upper and lower sandwiching pieces 18A, 18B are pressed toward the core wire 13 by an upper pressurizing portion 25A and a lower pressurizing portion 25B of the slide member 16 to be described later, the lower surface of the upper sandwiching piece 18A and the upper surface of the lower sandwiching piece 18B, in particular the lower surface of the upper holding protrusion 23A and the upper surfaces of the second holding protrusion 23C and the first holding protrusion 23B, are pressed against an oxide film formed on the surface of the core wire 13. In this way, the oxide film on the surface of the core wire 13 is stripped to expose a metal surface of the core wire 13. By the contact of the upper sandwiching piece 18A including the upper holding protrusion 23A and the lower sandwiching piece 18B including the second holding protrusion 23C and the like with this metal surface, the core wire 13 and the terminal body 15 are electrically connected.

Further, by setting the distance D equal to or less than the diameter of the core wire 13, the rear end edge 50AB formed on the rear end of the upper holding protrusion 23A and the front end edge 50CF formed on the front end of the second holding protrusion 23C shown in FIG. 5 bite into the oxide film formed on the surface of the core wire 13 if the upper and lower sandwiching pieces 18A, 18B are pressed toward the core wire 13. In this way, the oxide film on the surface of the core wire 13 is stripped, the upper holding protrusion 23A and the second holding protrusion 23C contact the exposed metal surface of the core wire 13, and the core wire 13 and the terminal body 15 are more reliably electrically connected. Here, since the rear end edge 50AB of the upper holding protrusion 23A and the front end edge 50CF of the second holding protrusion 23C are formed with the burrs 61 projecting toward the core wire 13 as described above, at least the tips of the burrs 61 bite into the oxide film formed on the surface of the core wire 13 and more reliably contact the metal surface of the core wire 13.

As shown in FIG. 5, a plurality of serrations 62 are provided in the lower surface of a rear end part of the upper sandwiching piece 18A. The serrations 62 are in the form of grooves extending in the lateral direction and formed in parallel at intervals in the front-rear direction. By providing the serrations 62, the oxide film on the surface of the core wire 13 is locally stripped by the groove edges and groove walls of the serrations 62 if the upper sandwiching piece 18A is pressed toward the core wire 13. In this way, the upper sandwiching piece 18A contacts the exposed metal surface of the core wire 13, and the core wire 13 and the terminal body 15 are more reliably electrically connected.

As shown in FIG. 5, the front end edge of the first holding protrusion 23B formed on the lower sandwiching piece 18B is shifted rearward by an interval S from the rear end edge of the second holding protrusion 23C. In other words, the first and second holding protrusions 23B, 23C are disposed at the interval S in the front-rear direction (extending direction of the wire 11). The interval S is set less than the diameter of the core wire 13 (e.g. specifically 0.1 to 0.8-fold, more specifically 0.4-fold to 0.8-fold of the diameter of the core wire 13).

By providing the interval S, the front end edge 50BF formed on the front end of the first holding protrusion 23B and the rear end edge 50CB formed on the rear end of the second holding protrusion 23C shown in FIG. 5 bite into the core wire 13 if the upper and lower sandwiching pieces 18A, 18B are pressed toward the core wire 13. If the oxide film formed on the surface of the core wire 13 is stripped in this way, the metal surface of the core wire 13 is exposed. The first and second holding protrusions 23B, 23C contact this metal surface, and the core wire 13 and the terminal body 15 are electrically connected. In this way, the connection reliability of the terminal 12 and the wire 11 is improved. Here, since the front end edge 50BF of the first holding protrusion 23B and the rear end edge 50CB of the second holding protrusion 23C are formed with the burrs 61 projecting toward the core wire 13 as described above, at least the tips of the burrs 61 bite into the oxide film formed on the surface of the core wire 13 and more reliably contact the metal surface of the core wire 13.

As described above, the serrations 62 are provided in the rear end part of the lower surface of the upper sandwiching piece 18A, i.e. a region of the upper sandwiching piece 18A facing a formation region of the first and second holding protrusions 23B, 23C of the lower sandwiching piece 18B. The serrations 62, the front end edge 50BF of the first holding protrusion 23B and the front end edge 50CF and rear end edge 50CB of the second holding protrusion 23C are formed at positions not overlapping each other in the front-rear direction. In this embodiment, the serrations 62 are not formed in the upper surface of the lower sandwiching piece 18B including the upper surfaces of the first and second holding protrusions 23B, 23C, but an effect equivalent to the one of a configuration in which serrations are provided in both facing regions of the upper and lower sandwiching pieces 18A, 18B is obtained by providing the interval S.

Further, by setting the interval S relatively small, the core wire 13 is less likely to be caught between the front end edge of the first holding protrusion 23B and the rear end edge of the second holding protrusion 23C when being inserted between the upper and lower sandwiching pieces 18A, 18B. When the wire 11 is inserted, the core wire 13 inserted onto the upper surface of the first holding protrusion 23B along the rear end surface in the form of a curved surface of the lower sandwiching piece 18B can be directly easily pushed to the upper surface of the second holding protrusion 23C.

[Slide Member 16]

As shown in FIGS. 1 and 2, the slide member 16 is in the form of a rectangular tube extending in the front-rear direction. The slide member 16 is formed into a predetermined shape by a known method such as press-working, cutting or forging. An arbitrary metal such as copper, copper alloy, aluminum, aluminum alloy or stainless steel can be appropriately selected as a metal constituting the slide member 16 if necessary. Although not particularly limited, the slide member 16 according to this embodiment is made of stainless steel. A plating layer may be formed on the surface of the slide member 16. An arbitrary metal such as tin, nickel or silver can be appropriately selected as a metal constituting the plating layer if necessary.

As shown in FIGS. 1 and 2, a jig contact portion 46 projecting upward is formed in a front end part of the upper wall of the slide member 16. A jig 45 to be described later contacts the jig contact portion 46 from behind (see FIG. 6).

As shown in FIG. 2, the upper wall of the slide member 16 is provided with the upper pressurizing portion (an example of a pressurizing portion) 25A projecting downward in a part of the slide member 16 near a rear end. The lower wall of the slide member 16 is provided with the lower pressurizing portion (an example of the pressurizing portion) 25B projecting upward. Inclined surfaces are formed on a front end part of the upper pressurizing portion 25A and a front end part of the lower pressurizing portion 25B. In this way, the rear end part of the upper sandwiching piece 18A and the rear end part of the lower sandwiching piece 18B are respectively guided downward of the upper pressurizing portion 25A and upward of the lower pressurizing portion 25B.

As shown in FIG. 1, partial lock receiving portions 26 are open at positions near front ends in side walls of the slide member 16. Further, full lock receiving portions 27 are open at positions rearward of the partial lock receiving portions 26 in the side walls of the slide member 16. The partial lock receiving portions 26 and the full lock receiving portions 27 are resiliently lockable to locking projections 28 respectively provided on the left side wall 38 and the right side wall 39 of the terminal body 15.

Figure 6:
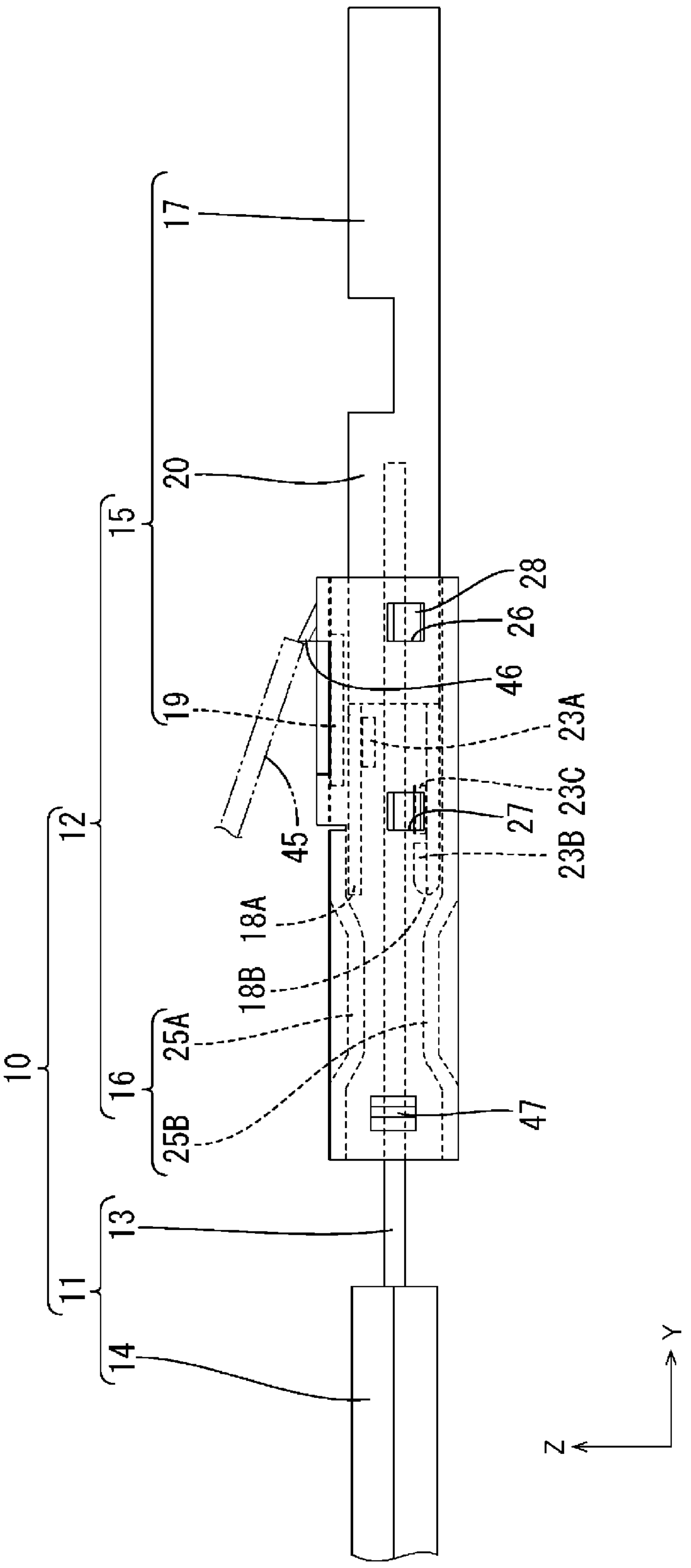
FIG. 6 is a side view showing a step of pushing a slide member disposed at a partial locking position forward with respect to the terminal body by a jig.

With the locking projections 28 of the terminal body 15 and the partial lock receiving portions 26 of the slide member 16 locked, the slide member 16 is held at a partial locking position with respect to the terminal body 15 (see FIG. 6). In this state, the upper and lower pressurizing portions 25A, 25B of the slide member 16 are located rearward of the rear ends of the upper and lower sandwiching pieces 18A, 18B of the terminal body 15. Further, in this state, an interval between the upper and lower sandwiching pieces 18A, 18B is set larger than the diameter of the core wire 13.

With the locking projections 28 of the terminal body 15 and the full lock receiving portions 27 of the slide member 16 locked, the slide member 16 is held at a full locking position with respect to the terminal body 15 (see FIGS. 1 and 2). In this state, the upper pressurizing portions 25A of the slide member 16 is in contact with the upper sandwiching piece 18A from above the upper sandwiching piece 18A. Further, the lower pressurizing portions 25B of the slide member 16 is in contact with the lower sandwiching piece 18B from below the lower sandwiching piece 18B.

As described above, the slide member 16 is slidable in the front-rear direction between the partial locking position and the full locking position in a state externally fit to a region of the terminal body 15 where the upper and lower sandwiching pieces 18A, 18B are provided.

As shown in FIG. 2, with the slide member 16 held at the full locking position with respect to the terminal body 15, the upper sandwiching piece 18A is bent downward by the upper pressurizing portion 25A pressing the upper sandwiching piece 18A from above. Further, the lower sandwiching piece 18B is bent upward by the lower pressurizing portion 25B pressing the lower sandwiching piece 18B from below. In this way, the core wire 13 disposed to extend in the front-rear direction (extending direction) in a space between the upper and lower sandwiching pieces 18A, 18B is vertically sandwiched by the bent upper and lower sandwiching pieces 18A, 18B. That is, the upper sandwiching piece 18A contacts the core wire 13 from above by being pressed down by the upper pressurizing portion 25A and the lower sandwiching piece 18B contacts the core wire 13 from below by being pressed up by the lower pressurizing portion 25B.

As shown in FIG. 2, with the slide member 16 held at the full locking position with respect to the terminal body 15, the upper holding protrusion 23A of the upper sandwiching piece 18A presses the core wire 13 from above and the first and second holding protrusions 23B, 23C of the lower sandwiching piece 18B press the core wire 13 from below. In this way, the core wire 13 is pressed from above by the upper holding protrusion 23A and pressed from below by the first and second holding protrusions 23B, 23C disposed at the positions shifted from the upper holding protrusion 23A in the front-rear direction, thereby being held in a state bent in the vertical direction (an example of a direction intersecting the extending direction). The core wire 13 is held in the terminal body 15 while being cranked between the upper holding protrusion 23A and the second holding protrusions 23C when viewed laterally.

As shown in FIG. 6 and the like, the jig contact portion 46 is formed in the front end part of the upper wall of the slide member 16. If the jig 45 is brought into contact with the jig contact portion 46 from behind, the slide member 16 is pushed by the jig 45 to move forward. Note that the jig 45 is relatively small in scale as compared to a mold and a facility for operating this mold. Thus, a cost increase caused by the jig 45 is suppressed.

As shown in FIG. 6, a pair of guiding portions 47 projecting inwardly of the slide member 16 are provided in both left and right side walls at positions of the slide member 16 near a rear end. The guiding portions 47 are so formed that an interval therebetween becomes narrower from rear to front. The core wire 13 slides in contact with the inner surfaces of the guiding portions 47, thereby being guided into the inside of the slide member 16.

[Manufacturing Process of Wire with Terminal 10]

Next, an example of a manufacturing process of the wire with terminal 10 according to this embodiment is described. The manufacturing process of the wire with terminal 10 is not limited to the one described below.

Figure 7:
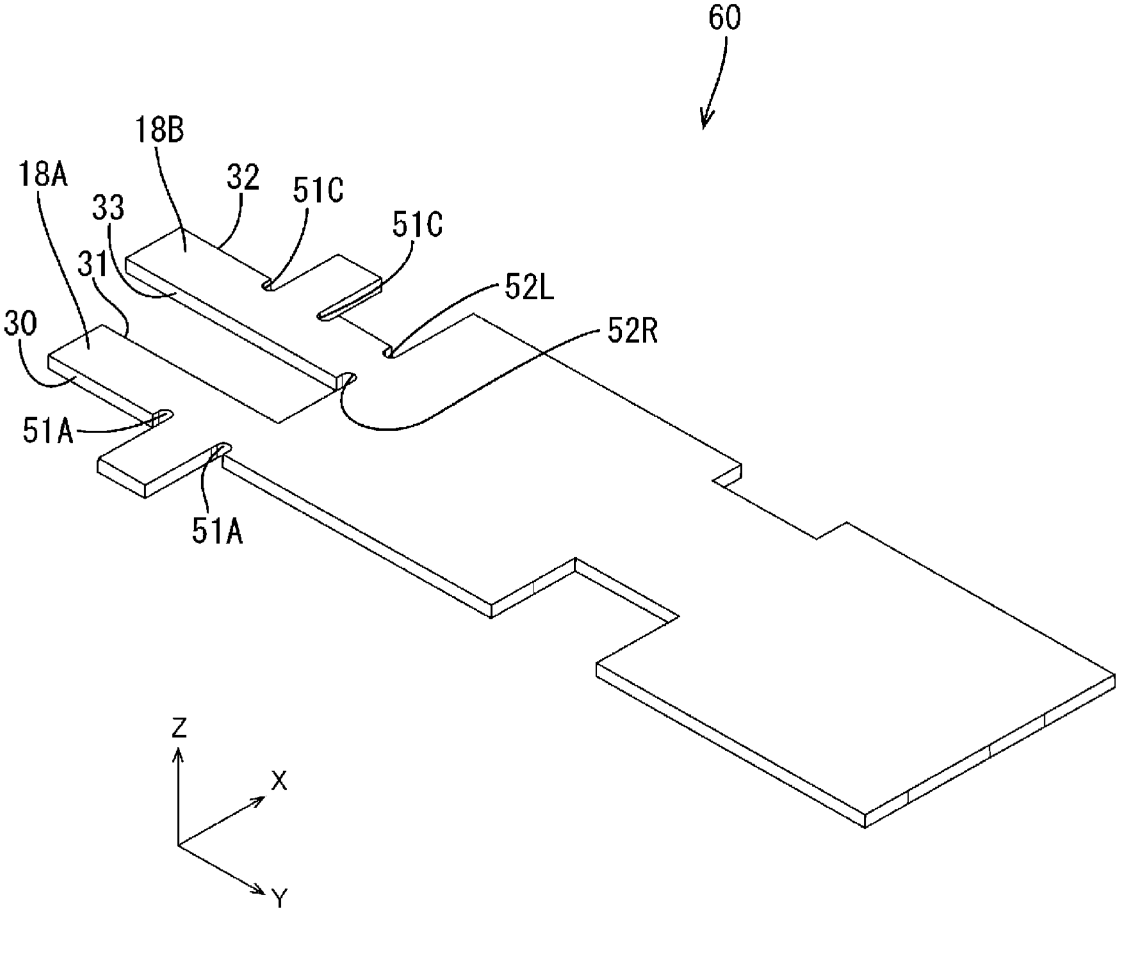
FIG. 7 is a perspective view showing a metal plate material constituting the terminal body.

The metal plate material 60 shaped as shown in FIG. 7 is cut out by shearing. Note that, although not shown in FIGS. 7 to 10, the burrs 61 are formed on the metal plate material 60 by shearing. The metal plate material 60 is so arranged that the burrs 61 project toward a lower surface side in FIG. 7. Further, although not shown in FIGS. 7 to 10, a plurality of grooves extending in the lateral direction are provided at intervals in the front-rear direction in the upper surface (constituting the lower surface of the rear end part of the upper sandwiching piece 18A in a state where the terminal 12 is completed), in FIG. 7, of a projecting end part of the metal plate material 60 for constituting the upper sandwiching piece 18A, whereby the serrations 62 are formed.

Figure 8:
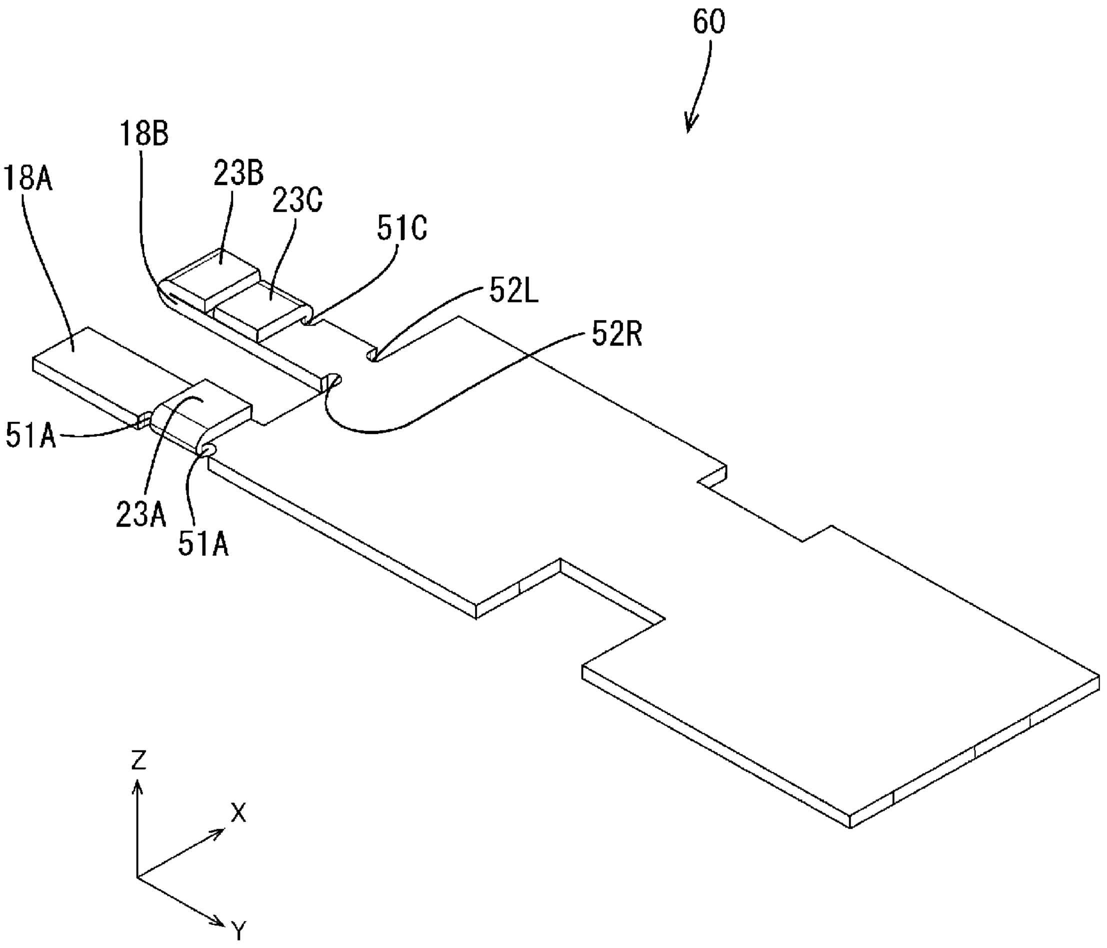
FIG. 8 is a perspective view showing a process of manufacturing the terminal body.

Subsequently, as shown in FIG. 8, the upper holding protrusion 23A is folded onto the upper sandwiching piece 18A, and the first and second holding protrusions 23B, 23C are folded onto the lower sandwiching piece 18B.

Figure 9:
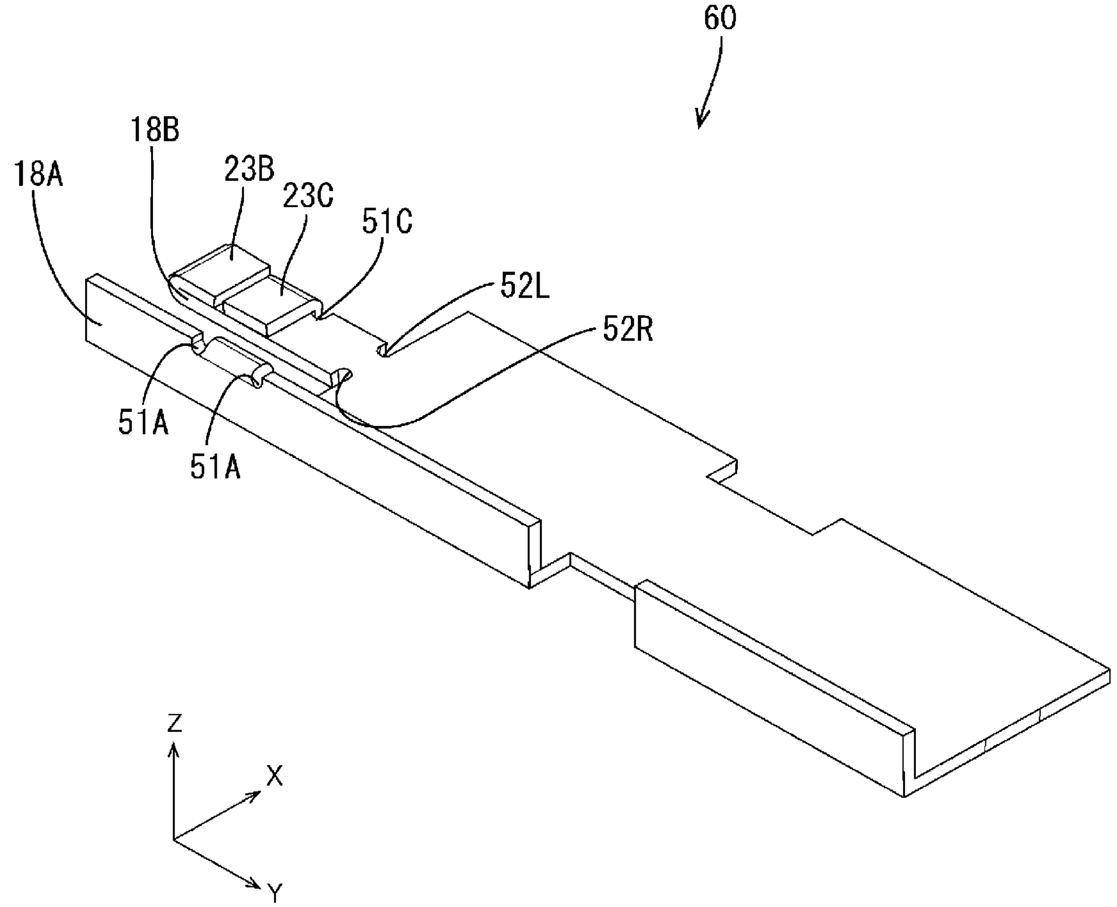
FIG. 9 is a perspective view showing the process of manufacturing the terminal body.
Figure 10:
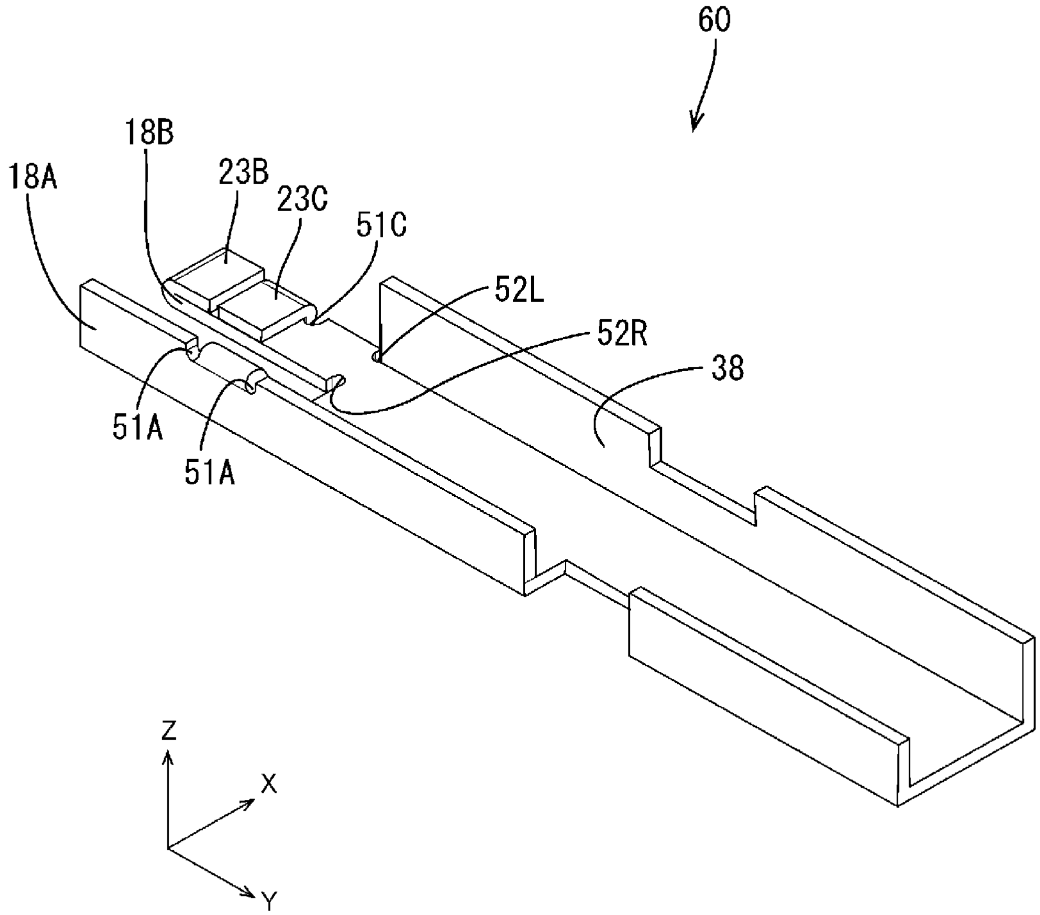
FIG. 10 is a perspective view showing the process of manufacturing the terminal body.

As shown in FIG. 9, a part corresponding to the upper wall of the terminal body 15 is bent. Thereafter, as shown in FIG. 10, a part corresponding to the left side wall 38 of the terminal body 15 is bent. Finally, a part corresponding to the right side wall 39 of the terminal body 15 is bent, whereby the terminal body 15 is formed.

The slide member 16 is formed by a known technique.

The slide member 16 is assembled with the terminal body 15 from behind. The front end edge of the slide member 16 comes into contact with the locking projections 28 of the terminal body 15 from behind, and the side walls of the slide member 16 are expanded and deformed. If the slide member 16 is pushed further forward, the side walls of the slide member 16 are restored and the partial lock receiving portions 26 of the slide member 16 are locked to the locking projections 28 of the terminal body 15. In this way, the slide member 16 is held at the partial locking position with respect to the terminal body 15. In this way, the terminal 12 is obtained (see FIG. 6).

The core wire 13 of the wire 11 is exposed by stripping the insulation coating 14 by a known technique. The front end part of the core wire 13 is introduced into the slide member 16 from the rear end part of the slide member 16. The core wire 13 comes into contact with the guiding portions 47 of the slide member 16, thereby being guided into the slide member 16. If the wire 11 is pushed further forward, the front end part of the core wire 13 enters the inside of the terminal body 15. At this time, since the rear end surface of the lower sandwiching piece 18B is formed into a smoothly curved surface, the front end part of the core wire 13 is smoothly guided into the space between the upper and lower sandwiching pieces 18A, 18B of the sandwiching portion 19 along the rear end surface and the upper surface of the lower sandwiching piece 18B.

With the slide member 16 held at the partial locking position with respect to the terminal body 15, the interval between the upper and lower sandwiching pieces 18A, 18B is set larger than the outer diameter of the core wire 13.

Subsequently, as shown in FIG. 6, the jig 45 is brought into contact with the jig contact portion 46 from behind to slide the slide member 16 forward. The slide member 16 is moved relatively forward with respect to the terminal body 15. At this time, the locking of the locking projections 28 of the terminal body 15 and the partial lock receiving portions 26 of the slide member 16 is released and the side walls of the slide member 16 ride on the locking projections 28 to be expanded and deformed.

If the slide member 16 is moved forward, the side walls of the slide member 16 are restored and the locking projections 28 of the terminal body 15 and the full lock receiving portions 27 of the slide member 16 are resiliently locked. In this way, the slide member 16 is held at the full locking position with respect to the terminal body 15.

With the slide member 16 held at the full locking position with respect to the terminal body 15, the upper pressurizing portion 25A of the slide member 16 is in contact with the upper sandwiching piece 18A of the terminal body 15 from above and presses the upper sandwiching piece 18A downward. Further, the lower pressurizing portion 25B of the slide member 16 is in contact with the lower sandwiching piece 18B of the terminal body 15 from below and presses the lower sandwiching piece 18B upward. In this way, the core wire 13 is vertically sandwiched by the upper and lower sandwiching pieces 18A, 18B in the sandwiching portion 19 (see FIG. 2).

As shown in FIG. 2, the core wire 13 is sandwiched by the lower surface of the upper sandwiching piece 18A and the upper surface of the lower sandwiching piece 18B, whereby the oxide film formed on the surface of the core wire 13 is stripped to expose the metal surface constituting the core wire 13. By the contact of the upper and lower sandwiching pieces 18A, 18B with this metal surface, the wire 11 and the terminal 12 are electrically connected.

In the above way, the wire with terminal 10 is completed.

With the core wire 13 vertically sandwiched by the upper and lower sandwiching pieces 18A, 18B, the core wire 13 is sandwiched by the upper holding protrusion 23A of the upper sandwiching piece 18A and the first and second holding protrusions 23B, 23C of the lower sandwiching piece 18B and held in a state extending in the front-rear direction and bent in the vertical direction. In this way, the burrs 61 formed on the rear end edge 50AB of the upper holding protrusion 23A and the front end edge 50CF of the second holding protrusion 23C bite into the core wire 13. Further, the core wire 13 is pressed against the first and second holding protrusions 23B, 23C of the lower sandwiching piece 18C. In this way, the burrs 61 formed on the front end edge 50BF of the first holding protrusion 23B and the rear end edge 50CB of the second holding protrusion 23C bite into the core wire 13. Since the core wire 13 can be very firmly held in this way, a holding force of the wire 11 and the terminal 12 can be enhanced when a pulling force is applied to the wire 11.

Functions and Effects of Embodiment

Next, functions and effects of this embodiment are described. The terminal 12 according to this embodiment is a terminal to be connected to the front end part of the wire 11 in the extending direction (front-rear direction) and provided with the terminal body 15 for sandwiching the wire 11 and the slide member 16 slidable with respect to the terminal body 15 along the extending direction of the wire 11. The terminal body 15 is formed by the worked metal plate material 60 and includes the sandwiching portion 19 for sandwiching the wire 11. The sandwiching portion 19 includes the first holding protrusion 23B formed by folding the metal plate material 60 on the rear side edge 35 of the lower sandwiching piece 18B intersecting the extending direction of the wire 11, projecting toward the wire 11 and configured to contact the core wire 13 of the wire 11 and the second holding protrusion 23C formed to be located forward of the first holding protrusion 23B in the extending direction of the wire 11 by folding the metal plate material 60 on the left side edge 32 of the lower sandwiching piece 18B along the extending direction of the wire 11, projecting toward the wire 11 and configured to contact the core wire 13 of the wire 11. The slide member 16 includes the upper and lower pressurizing portions 25A, 25B for pressing the sandwiching portion 19 toward the wire 11.

According to this configuration, out of the first and second holding protrusions 23B, 23C, the first holding protrusion 23B disposed on a rear side in the extending direction of the wire 11, i.e. on a wire insertion side, is formed by folding the metal plate material 60 on the rear side edge 35 of the lower sandwiching piece 18B intersecting the extending direction of the wire 11. Thus, in the terminal 12 according to this embodiment, since the rear end surface of the lower sandwiching piece 18B of the sandwiching portion 19 located on the wire insertion side is a smoothly curved surface, the wire 11 can be smoothly inserted while buckling is suppressed. As a result, according to the terminal 12 of this embodiment, the insertion workability of the wire 11 can be improved. Further, the second holding protrusion 23C disposed on a front side in the extending direction of the wire 11 is formed by folding the metal plate material 60 on the left side edge 32 of the lower sandwiching piece 18B along the extending direction of the wire 11. Thus, in the terminal 12 according to this embodiment, one end of the front end surface of the sandwiching portion 19 (front end surface of the second holding protrusion 23C) is coupled and fixed to another part, and the folded part is hardly turned up even if the wire 11 is pulled rearward. As a result, a holding force for holding the wire 11 can be improved according to the terminal 12 of the present disclosure.

Further, in the terminal 12 according to this embodiment, the first and second holding protrusions 23B, 23C are disposed at the interval S in the extending direction of the wire 11.

According to this embodiment, if the upper and lower sandwiching pieces 18A, 18B are pressed toward the core wire 13 by the upper and lower pressurizing portions 25A, 25B, the first and second holding protrusions 23B, 23C are pressed against the core wire 13 and the rear end edge 50CB formed on the rear end of the second holding protrusion 23C and the front end edge 50BF formed on the front end of the first holding protrusion 23B bite into the core wire 13. As a result, the terminal 12 is excellent in electrical connection reliability with the wire 11 and wire holding force. Note that the interval S between the first and second holding protrusions 23B, 23C is preferably set smaller (e.g. 0.1-fold to 0.8-fold, more specifically 0.4-fold to 0.8-fold) than the diameter of the core wire 13 to be sandwiched. Within such a range, the electrical connection reliability and the wire holding force can be improved while the efficiency of an inserting operation of the wire 11 is satisfactorily maintained.

Further, in the terminal 12 according to this embodiment, at least one of the first or second holding protrusions 23B, 23C has the burrs 61 formed by working the metal plate material 60, and is formed to contact the wire 11 with the burrs 61 projecting toward the wire.

According to this embodiment, if the upper and lower sandwiching pieces 18A, 18B are pressed toward the wire 11 by the upper and lower pressurizing portions 25A, 25B, at least parts of the burrs formed by working the metal plate material bite into the core wire 13 at the first or second holding protrusion 23B, 23C. As a result, the terminal 12 is excellent in electrical connection reliability with the wire 11 and wire holding force.

Further, the wire with terminal 10 according to this embodiment is provided with the terminal 12 described above and the wire 11 to be connected to the terminal 12.

Other Embodiments

The present disclosure is not limited to the above described and illustrated embodiment. For example, the following embodiments are also included in the technical scope of the technique described in this specification.

(1) Although the sandwiching portion 19 is provided with the upper holding protrusion 23A in addition to the first and second holding protrusions 23B, 23C in the above embodiment, there is no limitation to this. A sandwiching portion may include only first and second holding protrusions or may include four or more holding protrusions.

(2) Although the sandwiching portion 19 includes the upper and lower sandwiching pieces 18A, 18B for vertically sandwiching the core wire 13 in the above embodiment, there is no limitation to this. For example, one sandwiching piece may be disposed inside a tubular surrounding wall and a wire may be held between a wall surface and the sandwiching piece. Alternatively, a wire may be held by being laterally sandwiched.

(3) Although the serrations 62 are formed in the rear end part of the upper sandwiching piece 18A in the above embodiment, there is no limitation to this. Even if a serration forming step is omitted and no serrations are provided, an effect equivalent to the one obtained by applying serration can be obtained by providing a suitable interval between a plurality of holding protrusions.

(4) The terminal 12 may be a male terminal including a male tab.

LIST OF REFERENCE NUMERALS

10: wire with terminal
11: wire
12: terminal
13: core wire
14: insulation coating
15: terminal body
16: slide member
17: tube portion
18A: upper sandwiching piece
18B: lower sandwiching piece
19: sandwiching portion
20: base portion
23A: upper holding protrusion
23B: first holding protrusion
23C: second holding protrusion
25A: upper pressurizing portion (example of pressurizing portion)
25B: lower pressurizing portion (example of pressurizing portion)
26: partial lock receiving portion
27: full lock receiving portion
28: locking projection
30: left side edge (of upper sandwiching piece)
31: right side edge (of upper sandwiching piece)
32: left side edge (of lower sandwiching piece)
33: right side edge (of lower sandwiching piece)
35: rear side edge (of lower sandwiching piece)
38: left side wall
39: right side wall
45: jig
46: jig contact portion
47: guiding portion
50AB: rear end edge (of upper holding protrusion)
50AF: front end edge (of upper holding protrusion)
50BF: front end edge (of first holding protrusion)
50CB: rear end edge of (second holding protrusion)
50CF: front end edge of (second holding protrusion)
51A: cut (in base end part of upper holding protrusion)
51C: cut (in base end part of second holding protrusion)
52L: left easily bending portion
52R: right easily bending portion
60: metal plate material
61: burr
62: serration
D: distance (between upper holding protrusion and second holding protrusion)
S: interval (between first holding protrusion and second holding protrusion)

What is claimed is:

1. A terminal to be connected to a front end part of a wire in an extending direction, comprising:

a terminal body for sandwiching the wire; and a slide member slidable with respect to the terminal body along the extending direction of the wire, the terminal body being formed by a worked metal plate material, the terminal body including a sandwiching portion having a first sandwiching piece and a second sandwiching piece for sandwiching the wire between the first sandwiching piece and the second sandwiching piece, the sandwiching portion including:

a first holding protrusion formed by folding the metal plate material on a side edge of the first sandwiching piece intersecting the extending direction of the wire, projecting toward the wire and configured to contact the wire; and a second holding protrusion formed to be located forward of the first holding protrusion in the extending direction of the wire by folding the metal plate material on a side edge of the first sandwiching piece along the extending direction of the wire, projecting toward the wire and configured to contact the wire, and the slide member including a pressurizing portion for pressing the sandwiching portion toward the wire.

2. The terminal of claim 1, wherein the first and second holding protrusions are disposed at an interval in the extending direction of the wire.

3. The terminal of claim 1, wherein at least one of the first or second holding protrusions has burrs formed by working the metal plate material and is formed to contact the wire with the burrs projecting toward the wire.

4. The terminal of claim 1, wherein the sandwiching portion further includes a third holding protrusion formed by folding the metal plate material on a side edge of the second sandwiching piece along the extending direction of the wire, projecting toward the wire and configured to contact the wire.

5. A wire with terminal, comprising:

the terminal of claim 1; and a wire to be connected to the terminal.

* * * * *